United States Patent [19]

Gnagy

[11] Patent Number: 4,495,764
[45] Date of Patent: Jan. 29, 1985

[54] INTEGRATED INSULATION WALL ASSEMBLY

[75] Inventor: Clayton C. Gnagy, Enumclaw, Wash.

[73] Assignee: The United States of America as represented by the Secretary of the Air Force, Washington, D.C.

[21] Appl. No.: 498,335

[22] Filed: May 26, 1983

[51] Int. Cl.³ .............................. F02K 9/34
[52] U.S. Cl. ........................ 60/255; 60/290
[58] Field of Search ................. 60/253, 255; 102/289, 102/290, 291; 428/71–73

[56] References Cited

U.S. PATENT DOCUMENTS

| | | | |
|---|---|---|---|
| 2,941,759 | 6/1960 | Rice et al. | 244/117 |
| 2,957,309 | 10/1960 | Kobbeman | 60/255 |
| 3,001,362 | 9/1961 | Runton | 60/35.6 |
| 3,066,822 | 12/1962 | Watter | 220/3 |
| 3,103,784 | 9/1963 | Vetter et al. | 102/291 |
| 3,104,523 | 9/1963 | O'Donnell | 60/255 |
| 3,108,433 | 10/1963 | DeFries et al. | 60/255 |
| 3,182,469 | 5/1965 | Kirchner | 62/467 |
| 3,226,928 | 1/1966 | Webb et al. | 60/35.6 |
| 3,357,588 | 12/1967 | Graham | 220/10 |
| 3,416,944 | 12/1968 | Pirrung et al. | 117/46 |
| 3,436,292 | 4/1969 | Hatch et al. | 156/222 |
| 3,973,397 | 8/1976 | Chase et al. | 60/253 |
| 4,061,812 | 12/1977 | Gilwee et al. | 428/71 |
| 4,337,218 | 6/1982 | Byrd et al. | 102/289 |

Primary Examiner—Louis J. Casaregola
Attorney, Agent, or Firm—Donald J. Singer; Jacob N. Erlich

[57] ABSTRACT

An integrated three-component insulation wall assembly which can be used by itself as an insulation wall assembly, or which can be incorporated into a solid rocket motor case that is made of material fabricated using conventional layup construction methods, or which can provide the contour stability necessary to allow its functioning as a mandrel for filament-winding a solid rocket motor case, and which can be spliced and reinforced across the splice. The insulation wall assembly comprises, in an integrated condition, an inner wall component (i.e., a flame side wall component) which is laminated from woven reinforcements in an ablative matrix, a middle wall component of non-metallic honeycomb core material, and an outer wall (i.e., a pressure side wall component). The inner wall component provides a fire barrier; the middle wall component provides thermal insulation; and the outer wall component provides structural stability.

12 Claims, 4 Drawing Figures

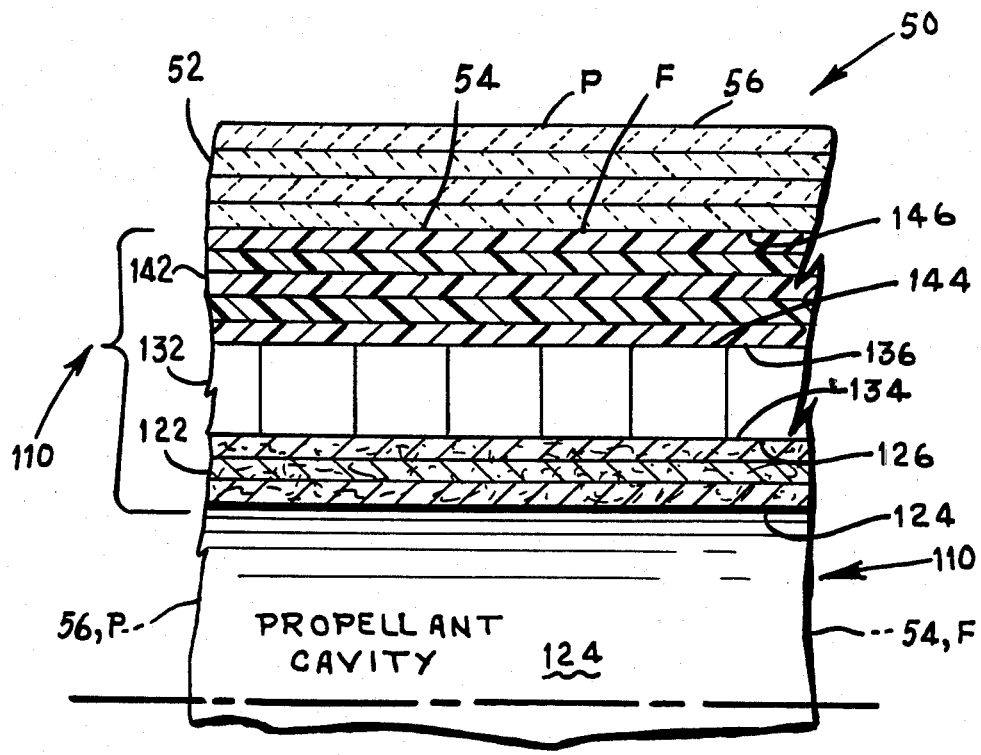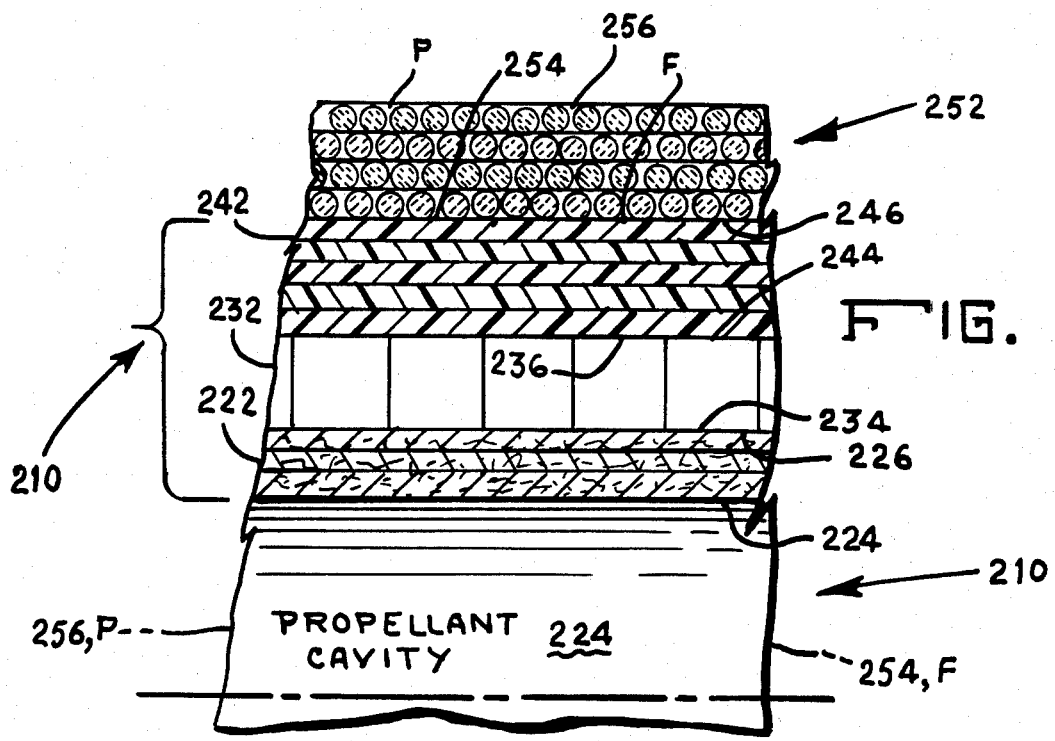

INTEGRATED INSULATION WALL ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates to a unique integrated wall assembly which is useable per se as an insulation assembly, or as a constituent insulation component of a solid rocket motor while disposed internally of the casing of the solid rocket motor, or as a mandrel for filament-winding a solid rocket motor case.

The internal insulation used in filament-wound solid rocket motors is usually elastomeric material containing an assortment of filler materials. This insulation is assembled in a mold by laying up plies of uncured sheet material to produce the desired thickness, and then curing the assembly under pressure and heat. The cured insulation assembly is incorporated into the filament wind mandrel and is integrally bonded to the motor case formed by the winding process.

The process described above is very time consuming, expensive, and of concern from a reliability aspect. More specifically, the uncured insulation sheet material is difficult to process. It must be cut into precise patterns in order to fit the mold. Additionally, interlaminar adhesion of the cut elements is poor, and air entrapment is a continual problem. Further, quality assurance of the finished product is dependent upon detecting voids and deliminations by means of ultrasonic inspection and x-ray. These methods are expensive and not as reliable as desired.

Elastomeric insulation used in present day solid rocket motors is the result of extensive development in an attempt to overcome the above-described problems. Although there are many variations in the elastomer and the filler used, it is fair and accurate to say that none of these variations have resulted in any significant improvement in insulating efficiency.

SUMMARY OF THE INVENTION

I have invented a wall assembly which not only eliminates the aforesaid problems of the prior art, but also is useable per se as a insulation assembly. By doing so, I have significantly advanced the state-of-the-art.

The instant invention eliminates the aforesaid problems by providing an integrated three-component insulation wall assembly: which can be incorporated into a solid rocket motor case that is made of material fabricated using conventional layup construction techniques; which can provide the contour stability necessary to allow its functioning as a mandrel for filament-winding a solid rocket motor case; and which can be spliced and reinforced by removable reinforcements proximate the splice. Briefly described, the inventive wall insulation assembly comprises, in an integrated condition, an inner wall component (i.e., a flame side wall component) which is laminated from woven reinforcements in an ablative matrix, a middle wall component of non-metallic honeycomb core material, and an outer wall component (i.e., a pressure side wall component). The inner wall component provides a fire barrier; the middle wall component provides thermal insulation; and the outer wall component provides structural stability.

Accordingly, it is an object of the instant invention to provide a unique insulation wall assembly which is useable per se in a integrated insulation wall assembly.

It is another object of this invention to provide an insulation wall assembly which can be incorporated into a solid rocket motor case that is made of material fabricated by using conventional layup construction methods.

It is still another object of the instant invention to provide a mandrel which can be used for filament-winding a rocket motor case.

It is yet another object of this invention to provide a solid rocket motor case insulation assembly which can be spliced and reinforced by removable reinforcements proximate the splice.

These objects of the instant invention, as well as other objects related thereto (e.g., simplicity, reliability, and the like), will become readily apparent after a consideration of the description of the instant invention, together with reference to the contents of the Figures of the drawing.

DESCRIPTION OF THE DRAWING

FIG. 2 is a side elevation view, also, in simplified schematic and pictorial form, fragmented, in cross section, and not to scale, of a variation of the preferred embodiment shown in FIG. 1 while in use as a constituent component of a solid rocket motor case assembly, wherein the solid rocket motor case is made of material fabricated using layup construction methods;

FIG. 3 also is a side elevation view, in simplified schematic and pictorial form, and fragmented, in cross section, and not to scale, of another variation of the preferred embodiment shown in FIG. 1 while in use as a mandrel for filament-winding a solid rocket motor case.

DESCRIPTION OF THE PREFERRED EMBODIMENT AND VARIATIONS THEREOF

Figure 1:
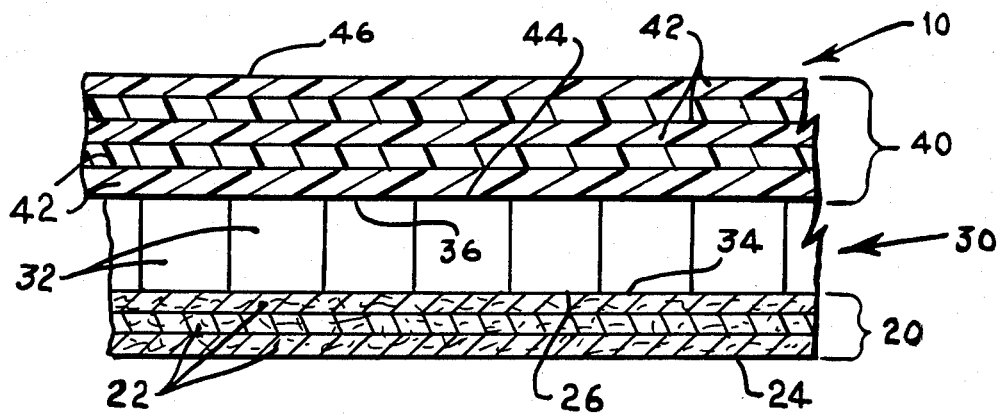
FIG. 1 is a side elevation view, in simplified schematic and pictorial form, fragmented, in cross section, and not to scale, of the preferred embodiment of the inventive integrated insulation wall assembly.

With reference to FIG. 1, therein is shown, in a side elevation view and in cross section, a representative portion of the preferred embodiment 10 of the instant invention, i.e., a unique integrated insulation wall assembly.

In the most basic and generic structural form, the preferred embodiment 10 of the instant invention comprises: means (generally designated 20) for providing a fire barrier for the wall assembly 10, with this means 20 having an internal surface 24 which functions as the internal surface of the wall assembly 10; means (generally designated 30) for providing thermal insulation for the wall assembly, with this means 20 having an internal surface 34 in contact with and joined to the external surface 26 of the fire barrier providing means 20; and means (generally designated 40) for providing structural stability to the thermal insulation providing means 30, with this structural stability providing means 40 having an internal surface 44 in contact with and joined to the external surface 36 of the thermal insulation providing means 30, and with the external surface 46 of this structural stability providing means 40 functioning as the external surface of the wall assembly 10.

More specifically, the fire barrier providing means 20 includes a first wall component 22 having internal surfaces 24 and external surface 26, with this component 22 being made of ablative composite material bonded by ablative matrix material. The thermal insulation providing means 30 includes a second wall component 32 having internal surface 34 and external surface 36, with this component 32 being made of non-metallic honeycomb core material. The structural stability providing means 40 includes a third wall component 42 having internal surface 44 and external surfaces 46, with this component 42 being made of a composite material.

As a matter of preference and not of limitation, the ablative composite material of the first wall component 22 is either ceramic or carbon fibers, and the ablative matrix material of the first wall component 22 is phenolic resin material, polyimide resin material, or any other suitable resin material. Similarly as a matter of preference, the external surface 26 of the first wall component 22 and the internal surface 34 of the second wall component 32 are joined by bonding (e.g., a bond or a bonding material), and the external surface 36 of the second wall component 32 and the internal surface 44 of the third wall component 42 are joined also by bonding (e.g., a bond or a bonding material).

Now, with reference to FIG. 2, therein is shown in a fragmented side elevation view and in cross section, a variation 110 of the preferred embodiment 10, FIG. 1, while in use as a constituent component 110 of a solid rocket motor case assembly 50.

The solid rocket motor case assembly 50 comprises, in essence, a solid rocket motor case component 52, and an integrated insulation subassembly component 110 (i.e., the above-mentioned variation 110 of preferred embodiment 10, FIG. 1), with this component 110 disposed internally of and positioned in contact with, and joined to, the inner surface 54 of the motor case component 52.

More specifically, the solid rocket motor case component 52 has the aforementioned inner surface 54 on the inner flame side F of the motor case 52, and said case 52 also has an outer pressure side P with a surface 56 (i.e., an external surface) thereat. The case 52 is made of material fabricated using layup construction methods which are well-known in the art. The integrated insulation subassembly component 110 is in contact with, and is joined to, the inner flame side surface 54 of the solid rocket motor case component 52, and includes (in integrated form) an innermost wall 122, a middle wall 132 disposed in contact with and joined to the innermost wall 122, and an outermost wall 142 disposed in contact with, and joined to the middle wall 122 on one side, and to the inner flame side surface 54 of the solid rocket motor case component 52 on the other side.

The innermost wall 122 is made of ablative composite material bonded by an ablative matrix material. This wall 122 has an external surface 126, and also has an internal surface 124 which functions as the internal surface of the entire integrated subassembly component 110 and which serves as the flame side surface of the subassembly component 110.

The middle wall 132 is made of non-metallic honeycomb core; has an external surface 136; and has an internal surface 134 which is disposed in contact with and is joined to the external surface 126 of the innermost wall 122.

The outermost wall 142 is made of a suitable composite material; has an internal surface 144 in contact with and joined to the external surface 136 of the middle wall; and has an external surface 146 which is disposed in contact with and joined to the inner flame side surface 54 and F, of the solid rocket motor case component 52, with this external surface 146 thereby serving as the pressure side surface of the integrated insulation subassembly component 110.

As a result of the above-described structuring and positioning of the walls 122, 132 and 142, the innermost wall 122 provides a fire barrier; the middle wall 132 provides thermal insulation for the solid rocket motor case component 52; and the innermost wall 142 provides structural stability to the middle wall 132, and also to the integrated insulation subassembly component 110 as a whole.

As a matter of preference and not of limitation, the ablative composite material of the innermost wall 122 is either ceramic or carbon fibers, and the ablative matrix material of the innermost wall is phenolic resin material, polyimide resin material, or any other suitable resin material. Similarly as a matter of preference, the external surface 126 of the innermost wall 122 and the internal surface 134 of the middle wall 132 are joined by bonding (e.g., a bond or a bonding material), and the external surface 136 of the middle wall 132 and the internal surface 144 of the outermost wall 142 are joined by bonding (e.g., a bond or a bonding material).

Now, with reference to FIG. 3, therein is shown, in a fragmented side elevation view and in cross section, another variation 210 of the preferred embodiment 10, FIG. 2, while in use as a mandrel 210 for the filament winding of a solid rocket motor case 252 which is to have an internal surface 254 (i.e., a flame side surface F) of a preselected desired shape.

The mandrel 210 comprises a unitary structure (i.e., an integrated or one-piece unit) which in turn includes, in combination: an outer wall component 242 made of a suitable composite material, having an internal surface 244, and having an external surface 246 configured in a shape complementary to the preselected shape of the internal flame side surface 254 and F of the solid rocket motor case 252 which is to be made by filament winding; a middle wall component 232 made of non-metallic honeycomb core material, and having an internal surface 234, and also having an external surface 236 which is disposed in contact with and is joined to the internal surface 244 of the outer wall component 242; and an inner wall component 222 made of ablative composite material, and having an external surface 226 which is disposed in contact with and is joined to the internal surface 234 of the middle wall component, and also having an internal surface 224 which serves as the flame side surface of the mandrel 210.

As a matter of preference and not of limitation, the ablative composite material of the inner wall component 222 is either ceramic or carbon fibers, and the ablative matrix material of the inner wall component 22 is phenolic resin material, polyimide resin material, or any other suitable resin material. Similarly as a matter of preference, the internal surface 244 of the outer wall component 242 and the external surface 236 of the middle wall component 232 are joined by bonding (e.g., a bonding material), and the internal surface 234 of the middle wall component 232 and the external surface 226 of the inner wall component 222 are joined also by bonding (e.g., a bond or a bonding material).

Figure 4:
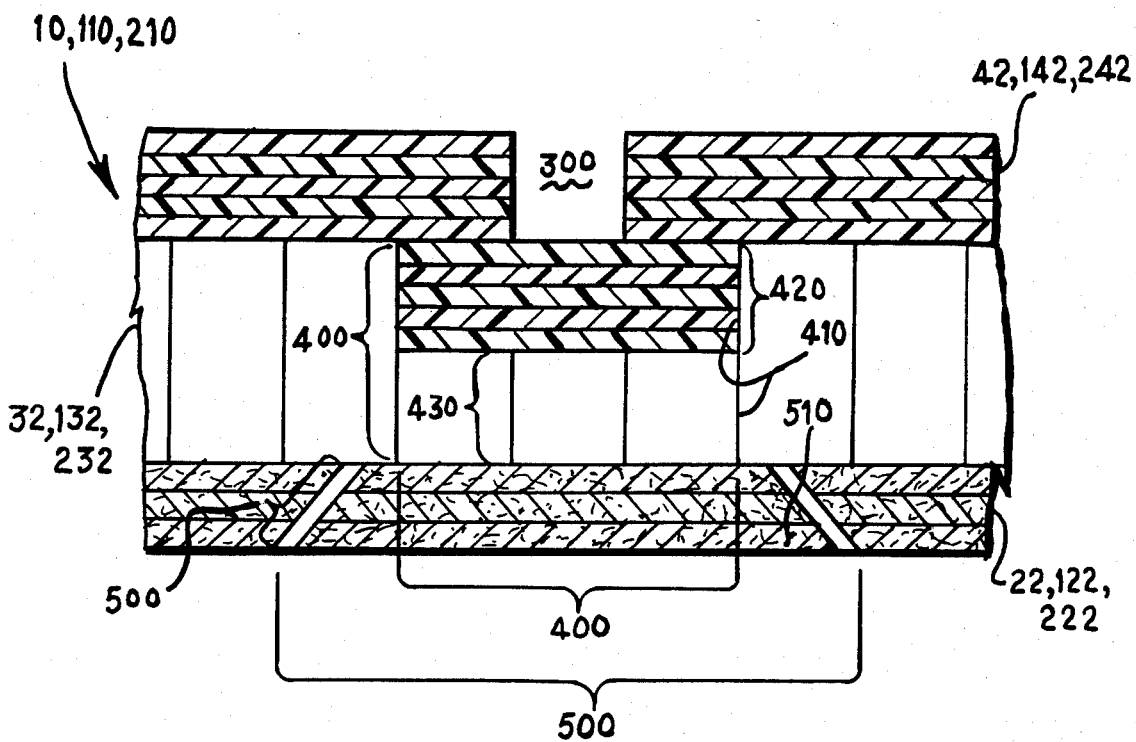
FIG. 4 is a side elevation view in simplified schematic and pictorial form, fragmented, in cross section, not to scale, and enlarged in the interest of clarity, of a representative portion of the preferred embodiment of the inventive integrated insulation wall assembly, shown per se in FIG. 1 and shown in the variations in use in combination with other components in FIGS. 2 and 3, with said FIG. 4 depicting typical splices, and reinforcements made by removable reinforcements proximate the splice, which can be made to the components of the wall assembly.

Now, with reference to FIG. 4, therein is shown (in a side elevation, in simplified schematic and pictorial form, fragmented, in cross, not to scale, and enlarged in the interest of clarity) a representative portion of the preferred embodiment 10, FIG. 1, and of the variations thereof 110, FIG. 2, and 210, FIG. 2, showing that splices (i.e., openings, cuts, voids and the like between two adjacent portions of the same constituent component) can be made and reinforced with and by the use of splice pieces (referred to hereinafter as "splice component", or "splice and reinforcement component38 , as applicable).

Again with reference to FIG. 4, it is to be noted that since the splicing and reinforcement of the splice is structurally the same for the preferred embodiment 10, FIG. 1, and for the two variations thereof 110, FIG. 2, and 210, FIG. 3, FIG. 4 embodies one representation applicable to said preferred embodiment and said two variations.

Still with reference to FIG. 4, therein are shown the third wall component 42 of the preferred embodiment 10, the outermost wall 142 of the integrated insulation subassembly 110, and the outer wall component 242 of the mandrel 210, with an opening 300 therein and therethrough. Additionally, also shown in FIG. 4 are the second wall component 32 of the preferred embodiment 10, the middle wall 132 of the integrated insulation subassembly 110, and the middle wall component 232 of the mandrel 210, with a void 400 therein and therethrough adjacent to and across the opening 300. Further shown in FIG. 4 are the first wall component 22 of the preferred embodiment 10, the innermost wall 122 of the integrated insulation subassembly 110, and the inner wall component 222 of the mandrel 210, with an opening 500 therein and therethrough.

Accordingly, the preferred embodiment 10, the integrated insulation subassembly 110, and the mandrel 210 structurally can further comprise or include:

a. a splice and reinforcement component 410 comprising, in turn, a first portion 420 made of the same material as the third wall component 42 of the preferred embodiment 10, the outer most wall 142 of the integrated insulation assembly 110, and the outer wall component 242 of the mandrel 210, and second portion 430 made of the same material as the second wall component 32 of the preferred embodiment 10, the middle wall 132 of the integrated insulation subassembly 110, and the middle wall component 232 of the mandrel 210, with these first and second portions 420 and 430 of the splice and reinforcement component 410 joined in registration, and with the splice and reinforcement component 410 disposed in the void 400 with the first portion 420 position adjacent to and across the opening 300 and with the second portion 430 positioned adjacent to the opening 500, and also with the first portion 420 joined to the wall 42, 142, 242 and to the wall 32, 132, 232, and also with the second portion 430 joined to wall 32, 132, 232; and b. a splice component 510 which is made of the same material as wall 22, 122, 222, and which is disposed in opening 500, and also which is joined to wall 22, 122, 222 and to wall 32, 132, 232 and to the second portion 430 of the splice and reinforcement component 410.

MANNER OF USE OF THE PREFERRED EMBODIMENT AND VARIATIONS THEREOF

The manner of use, and of operation, of the preferred embodiment 10, FIG. 1, and of the variations thereof 110, FIG. 2, and 210, FIG. 3, of the instant invention can be easily ascertained by any person of ordinary skill in the art from the foregoing descriptions thereof, coupled with reference to the contents of the Figures of the drawing, particularly FIGS. 1-3, inclusive. Accordingly, any discussion of the manner of use and operation is needless and, therefore, is not made.

CONCLUSION

It is abundantly clear from all of the foregoing, and from the contents of the Figures of the drawing, that the stated objects of the instant invention, as well as other objects related thereto, have been achieved.

It is to be noted that, although there have been described and shown the fundamental and unique features of the instant invention, as applied to a preferred embodiment and two variations thereof adapted for particular uses, nevertheless other embodiments, variations, adaptations, substitutions, additions, omissions, and the like may occur to and can be made by those of ordinary skill in the art, without departing from the spirit of the instant invention.

What is claimed is:

1. An integrated insulation wall assembly, comprising:
   a. means for providing a fire barrier for said wall assembly, with this means including a first wall component made of ablative composite material bonded by ablative matrix material and having an external surface, and an internal surface which functions as the internal surface of said wall assembly;
   b. means for providing thermal insulation for said wall assembly, with this means including a second wall component made of non-metallic honeycomb core material and having an external surface, and an internal surface in contact with and joined to said external surface of said fire barrier providing means; and
   c. means for providing structural stability to said thermal insulation providing means, with said structural stability providing means including a third wall component made of a composite material and having an external surface, and an internal surface in contact with and joined to said external surface of said thermal insulation providing means, and with said external surface of said structural stability providing means functioning as the external surface of said wall assembly.

2. A integrated insulation wall assembly, as set forth in claim 1, wherein:
   a. said ablative composite material of said first wall component is selected from the group consisting of ceramic and carbon fibers; and
   b. said ablative matrix material of said first wall component is selected from the group consisting of phenolic resin material, polyimide resin material and any other suitable resin material.

3. An integrated insulation wall assembly, as set forth in claim 2, wherein said external surface of said first wall component and said internal surface of said second wall component are joined by a bond, and wherein said external surface of said second wall component and said internal surface of said third wall component are joined by a bond.

4. An integrated insulation wall assembly, as set forth in claim 3, wherein said third wall component has an opening therein and therethrough, and said second wall component has a void therein and therethrough adjacent to and across said opening in said third wall component, and said first wall component has an opening therein and therethrough adjacent to and across said void in said second wall component, and wherein said integrated wall assembly further comprises:
 a. a splice and reinforcement component which includes a first portion made of the same material as said third wall component and a second portion made of the same material as said second wall component, with said first and second portions joined in registration, and with said splice and reinforcement component disposed in said void in said second wall component, with said first portion positioned adjacent to and across said opening in said third wall component and with said second portion positioned adjacent to said opening in said first wall component, and also with said first portion joined to said third wall component and to said second wall component, and with said second portion joined to said second wall component; and
 b. a splice component, made of the same material as said first wall component, disposed in said opening in said first wall component, with said splice component joined to said first wall component, said second wall component, and said second portion of said splice and reinforcement component.

5. A solid rocket motor case assembly, comprising:
 a. a solid rocket motor case component having an inner flame side with a surface thereat, and an outer pressure side with a surface thereat, wherein said solid rocket motor case is made of material fabricated using layup construction methods; and
 b. an integrated insulation subassembly component disposed internally of said solid rocket motor case component and positioned in contact with, and joined to, said inner flame side surface of said solid rocket motor case component, wherein said insulation subassembly component includes:
  an innermost wall made of ablative composite material bonded by an ablative matrix material, wherein said innermost wall has an external surface, and an internal surface which functions as the internal surface of said integrated insulation subassembly component and serves as the flame side surface of said subassembly component;
  a middle wall made of non-metallic honeycomb core material, wherein said middle wall has an external surface, and an internal surface disposed in contact with and joined to said external surface of said innermost wall; and
  an outermost wall made of a composite material, wherein said outermost wall has an internal surface in contact with and joined to said external surface of said middle wall, and an external surface disposed in contact with and joined to said inner flame side surface of said solid rocket motor case component and thereby serves as the pressure side surface of said integrated insulation subassembly component; and
 thereby said innermost wall provides a fire barrier, said middle wall provides thermal insulation for said solid rocket motor case component, and said outermost wall provides structural stability to said middle wall, and also to said integrated insulation subassembly component as a whole.

6. A solid rocket motor case assembly, as set forth in claim 5, wherein:
 a. said ablative composite material of said innermost wall of said insulation subassembly component is selected from the group consisting of ceramic and carbon fibers; and
 b. said ablative matrix material of said innermost wall of said insulation subassembly component is selected from the group consisting of phenolic resin material, polyimide resin material and any other suitable resin material.

7. A solid rocket motor case assembly, as set forth in claim 6, wherein said external surface of said innermost wall and said internal surface of said middle wall are joined by a bond, and wherein said external surface of said middle wall and said internal surface of said outermost wall are joined by a bond.

8. A solid rocket motor case assembly, as set forth in claim 7, wherein said outermost wall has an opening therein and therethrough, and said middle wall has a void therein and therethrough adjacent to and across said opening in said outermost wall, and said innermost wall has an opening therein and therethrough adjacent to and across said void in said middle wall, and wherein said integrated insulation subassembly component further includes:
 a. a splice and reinforcement component comprising a first portion made of the same material as said outermost wall and a second portion made of the same material as said middle wall, with said first and second portions joined in registration, and with said splice and reinforcement component disposed in said void in said middle wall with said first portion positioned adjacent to and across said opening in said outermost wall and with said second portion positioned adjacent to said opening in said innermost wall, and also with said first portion joined to said outermost wall and to said middle wall, and with said second portion joined to said middle wall; and
 b. a splice component, made of the same material as said innermost wall, disposed in said opening in said innermost wall, with said splice component joined to said innermost wall, said middle wall, and said second portion of said splice and reinforcement component.

9. A mandrel for filament-winding a solid rocket motor case, comprising:
 a. an outer wall component made of a composite material, and having an internal surface, and an external surface configured in a shape complementary to a preselected desired shape of the internal flame side surface of said solid rocket motor case;
 b. a middle wall component made of non-metallic honeycomb core material, and having an internal surface, and an external surface which is disposed in contact with and is joined to said internal surface of said outer wall component; and
 c. an inner wall component made of ablative composite material bonded by an ablative matrix material, having an external surface which is disposed in contact with and is joined to said internal surface of said middle wall component, and an internal surface which serves as the flame side surface of said mandrel;

thereby said wall components are integrated, and said mandrel is a unified structure.

10. A mandrel for filament-winding a solid rocket motor case, as set forth in claim 9, wherein:
   a. said ablative composite material of said inner wall component is selected from the group consisting of ceramic and carbon fibers; and
   b. said ablative matrix material of said inner wall component is selected from the group consisting of phenolic resin material polyimide resin material and any other suitable resin material.

11. A mandrel for filament-winding a solid rocket motor case, as set forth in claim 10, wherein said internal surface of said outer wall component and said external surface of said middle wall component are joined by a bond, and wherein said internal surface of said middle wall component and said external surface of said inner wall component are joined by a bond.

12. A mandrel for filament-winding a solid rocket motor case, as set forth in claim 11, wherein outer wall component has an opening therein and therethrough, and said middle wall component has a void therein and therethrough adjacent to and across said opening in said outer wall component, and said inner wall component has an opening therein and therethrough adjacent to and across said void in said middle wall component, and wherein said mandrel further comprises:
   a. a splice and reinforcement component which includes a first portion made of the same material as said outer wall component and a second portion made of the same material as said middle wall component, with said first and second portions joined in registration, and with said splice and reinforcement component disposed in said void in said middle wall component with said first portion positioned adjacent to and across said opening in said outer wall component and with said second portion positioned adjacent to said opening in said inner wall component, and also with said first portion joined to said outer wall component and to said middle wall component, and with said second portion joined to said middle wall component; and
   b. a splice component, made of the same material as said inner wall component, disposed in said opening in said inner wall component, with said splice component joined to said inner wall component, said middle wall component, and to said second portion of said splice and reinforcement component.

* * * * *